Sept. 17, 1940.  R. W. KROUT  2,214,793
CANDY-PULLING MACHINE
Original Filed Dec. 7, 1937  3 Sheets-Sheet 1
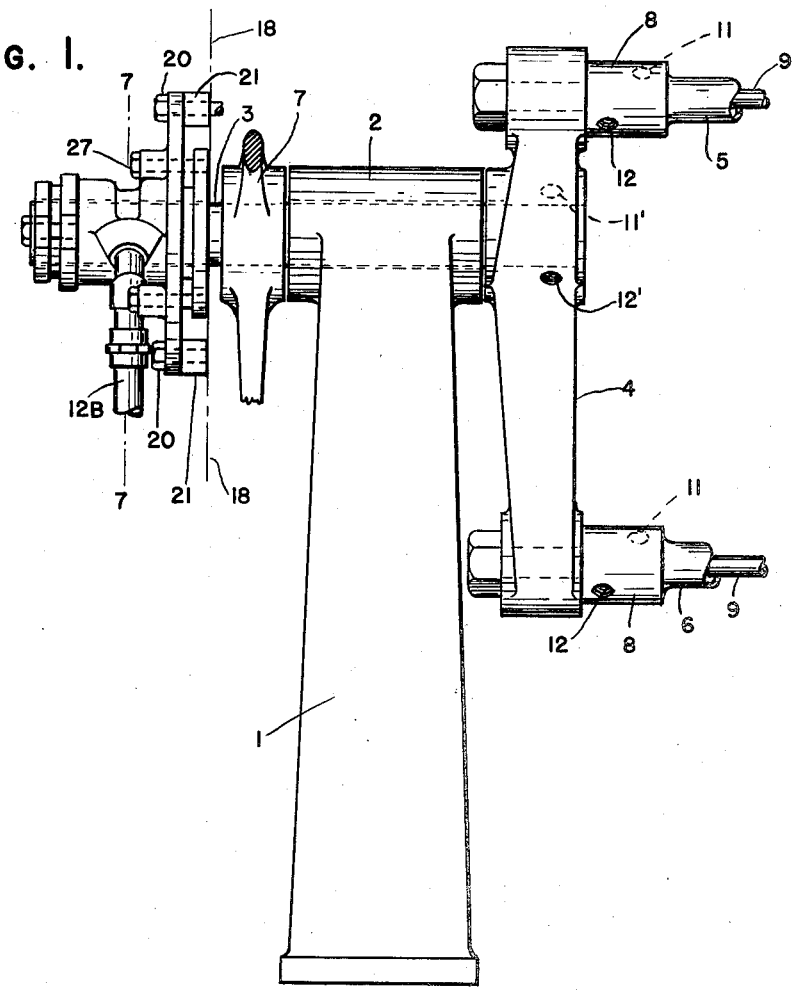
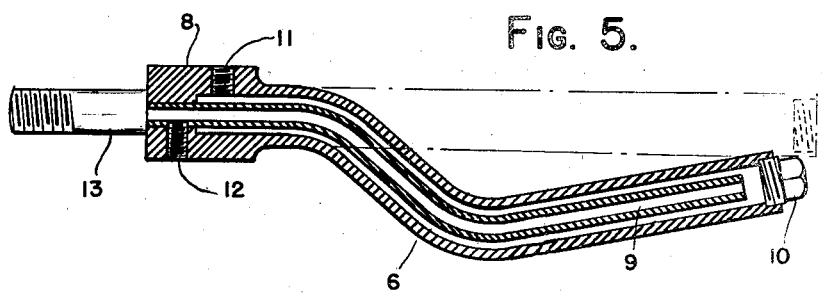
INVENTOR.
RAY W. KROUT.
BY *William F. Nickel*
ATTORNEY.

Sept. 17, 1940.   R. W. KROUT   2,214,793
CANDY-PULLING MACHINE
Original Filed Dec. 7, 1937   3 Sheets-Sheet 2
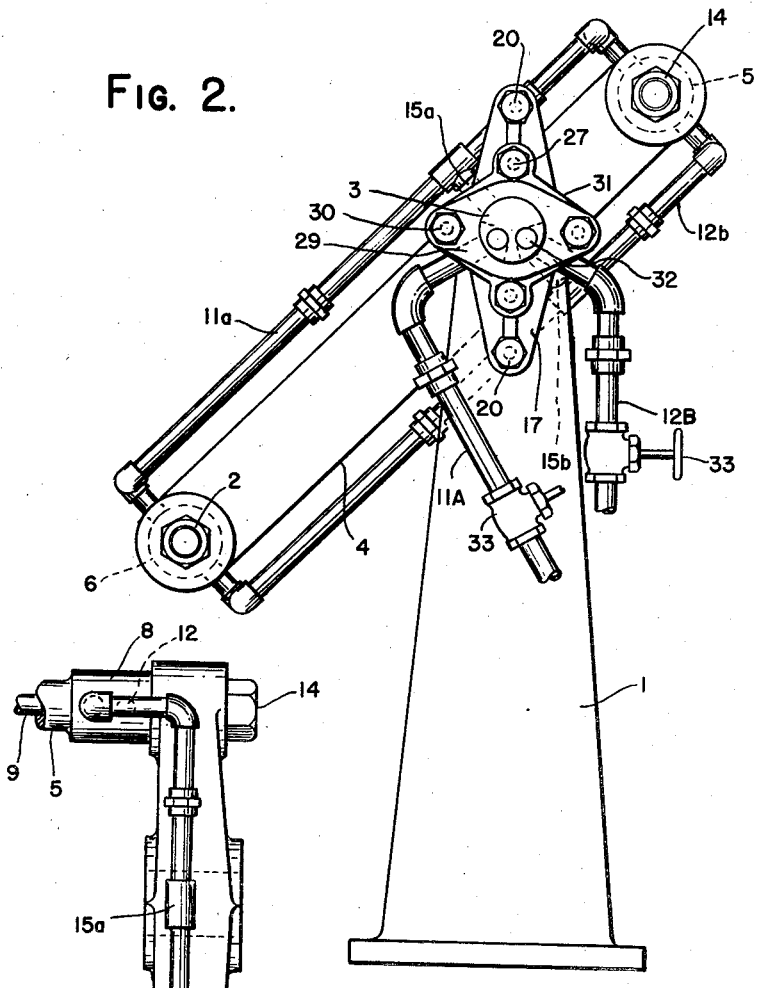
INVENTOR.
RAY W. KROUT.
BY 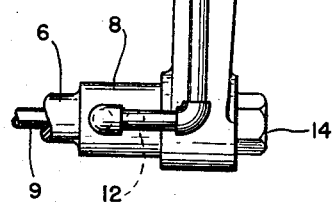
ATTORNEY.

Sept. 17, 1940.                R. W. KROUT                2,214,793
CANDY-PULLING MACHINE
Original Filed Dec. 7, 1937        3 Sheets-Sheet 3
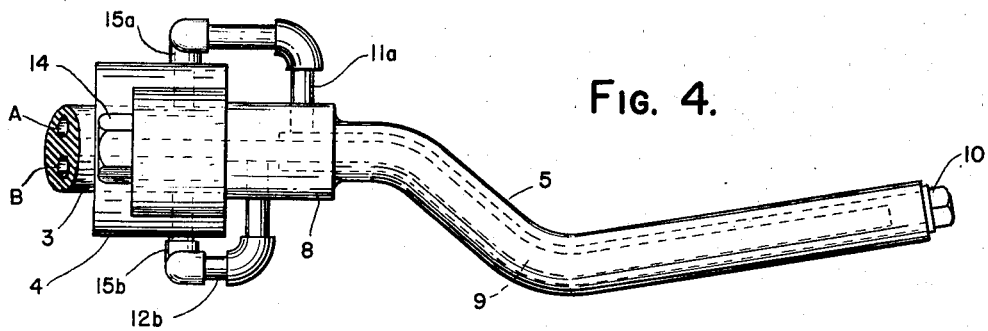
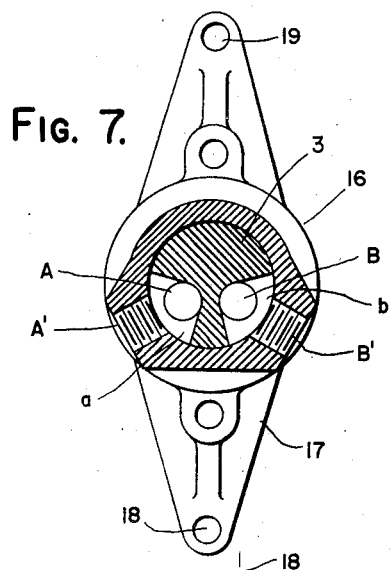
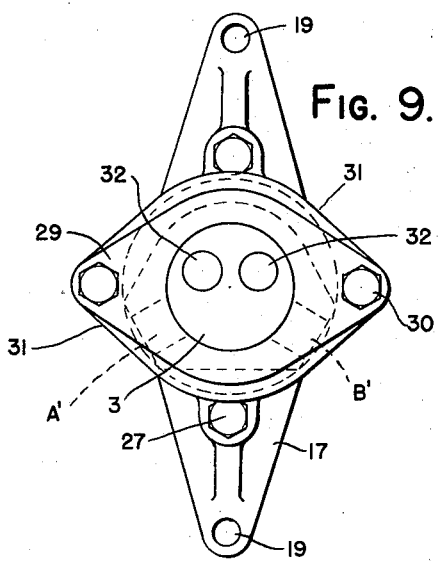
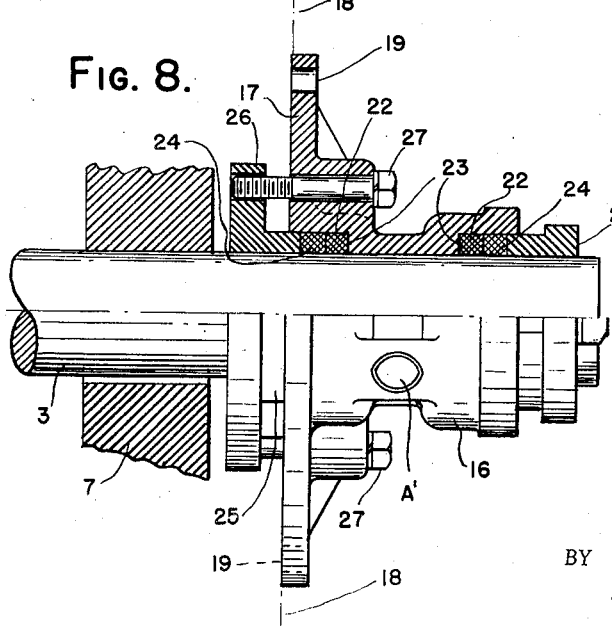
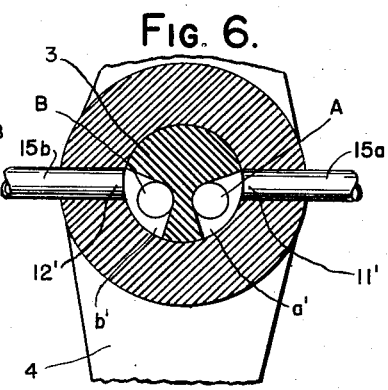
INVENTOR.
RAY W. KROUT.
BY *William F. Nickel*
ATTORNEY.

Patented Sept. 17, 1940

2,214,793

UNITED STATES PATENT OFFICE 2,214,793

CANDY-PULLING MACHINE

Ray W. Krout, Paterson, N. J., assignor to Charms Company, Bloomfield, N. J., a corporation of Delaware Application December 7, 1937, Serial No. 178,565
Renewed July 26, 1939

20 Claims. (Cl. 107—30)

This invention relates to improvements in candy-pulling machines, and particularly to apparatus having movable members for pulling taffy.

An object of the invention is to provide a candy-pulling machine capable of a greatly increased output, and so constructed that any tendency of a soft hot mass of candy to stick to parts of the machine after working and when the time comes to remove it, is obviated.

In candy-pulling machines of former construction, having revolving or otherwise moving parts with prongs, the batch of candy is stretched and pulled by the prongs for a predetermined period. When the operation is complete, the candy will usually stick to the prongs instead of coming off readily and freely as it should. The operator is then obliged to use a mallet or other tool to get the candy loose, and such an implement will make dents or otherwise roughen the prongs, so that the next batch tends to stick to a greater extent than before. In fact the prongs in such a machine soon deteriorate so much as to necessitate replacement. The rate of production is thus slowed down, and the costs are increased, with resulting loss in the output and efficiency of the unit.

This invention eliminates the drawbacks above mentioned by keeping the prongs cool, and in its preferred form it embodies a candy-pulling machine, having an arrangement of passages and ports through which a cooling medium passes to the prongs and is conducted out again. Such cooling medium may be water or some other agent, and I have found that by thus controlling the temperature of the apparatus, each batch of candy when still soft can be taken off the machine easily and quickly, without adhering and without requiring scraping of the parts carrying it. Further, the rate of operation is stepped up to the point, where one machine according to my invention and of the same size as a previous machine, will do the work of two ordinary machines, and at an even lower cost of labor in attendance.

A further advantage of this invention comes from the fact that when the cause of adhesion between the candy and the prongs is eliminated, the entire batch is uniformly pulled. In previous machines of this general type, the portions of the candy which stick to the prongs are really not pulled at all. This lack of pulling in portions of the batch of candy entails local lack of aeration in the mass, leaving hard spots therein. But with a machine according to this invention, the batch is uniformly pulled and aerated throughout, with resulting improvement in consistency and distribution of flavor through the batch, the flavor being added to the mass hung upon the prongs of the machine and at the commencement of the operation.

These and other objects and advantages of this invention are set out fully in the following description, but the disclosure is illustrative only, and shows a preferred form of the apparatus. Various changes in details can of course be adopted without departing from the spirit and scope of the invention.

On the drawings,

Figure 1 is a side view of enough of the construction to show a candy-pulling machine according to this invention;

Figure 2 is an end view of what appears in Figure 1 seen from the left;

Figure 3 is a top view of the rotating arms carrying the prongs of the machine shown in Figure 2;

Figure 4 is an elevation from above of one of the prongs upon which the candy is hung and stretched, showing its method of communication with the cooling system;

Figure 5 is a longitudinal section of the prong shown in Figure 4;

Figure 6 is a view partly in section of the carrier member for the prongs and the operating shaft;

Figure 7 is a section on 7—7, Figure 1;

Figure 8 is a side view partly in section showing the stuffing box through which the cooling medium is conducted to and from the apparatus; and Figure 9 is an outer end view of what is shown in Figure 8.

On the drawings the same numerals identify the same parts throughout.

The machine comprises posts or stanchions, one of which is indicated at 1; each post supporting a horizontal bearing 2 at its top for a rotatable shaft 3. On the shaft at one end of this bearing is a revolving carrier member 4 to the ends of which are fastened, in laterally projecting position, the prongs on which a batch of candy is to be hung. One of the prongs 5 is closer to the axis of revolution than the other 6. On the shaft, at the other end of the bearing, is an actuating element such as a sprocket wheel or other gear, the hub of which is indicated at 7 to enable the shaft to be turned by power. Machines of this type are well known, and in their complete form they comprise a pair of posts 1, each mounting a horizontal shaft 3 and rotatable carrier member 4 with a pair of prongs affixed thereto. The members, or arms 4, are opposed and the prongs on one extend towards the other. The members 4 and the prongs they carry will be so arranged that, while the prongs on the two members 4 overlap at their outer ends, they will move in circles of such radius that one pair of prongs will not obstruct the opposing pair. Hence the candy on the prongs will be engaged at several points in each revolution and stretched to the required extent.

In this application only one post and one pair of prongs 5 and 6 are illustrated. The other post, carrier and prongs will be placed at the right of Figure 1, for example, so that both pairs of prongs operate in the manner above outlined. The sprocket wheels for the two shafts can be connected to any suitable source of power, so that the shafts turn in unison.

Each of the prongs will have a thick end 8 which abuts the adjacent outer end of the member 4. Each prong itself is hollow and contains an inner tube 9 of smaller diameter. This tube 9 is put in place by inserting it into a tight fitting socket in the base 8, and after the prong receives this inner tube, both prong and inner tube are bent to the form shown in Figures 4 and 5. The outer end of each prong is closed by a screw plug 10. The cooling medium enters the prong through an inlet port 11, located in the base 8, flows outward toward the plug 10, and then back through the open inner end of the tube 9 to an outlet port 12. The entering fluid is thus caused to fill the space adjacent the outer wall of each prong, giving the greatest cooling effect. The prong and the inner tube are straight before bending, as indicated on Figure 5.

From the end 8 of each of these prongs projects a threaded stud 13, passing through an opening in the adjacent end of the carrier arm 4, and adapted to receive a nut 14, to hold the prong rigidly in position when it is attached to the member 4. The plane of the bent prongs will not be radial as regards the axis of revolution of the shaft 3, but the two bent portions thereof will rather lie in a plane which is tangential to the circular path described by the adjacent end of the carrier arm 4 and the concave side of each prong is presented forward relative to the direction of rotation. Hence there is no tendency of the candy to slip off the outer ends of the prongs.

To conduct the water or other cooling fluid into and out of the machine I provide a supply pipe 11A and an exhaust pipe 12B through which water flows in and passes out again. The supply and exhaust pipes 11A and 12B are both connected to longitudinal ducts A and B in the shaft 3. These ducts or channels are connected by pipes 11a and 12b to the prongs, these pipes leading to the inlets 11 and outlet 12 respectively. The pipes 11a and 12b are respectively connected by T-couplings and short pipes 15a and 15b to ports 11' and 12' in the hubs of the arms 4; and these ports 11' and 12' communicate with the channels A and B in the shaft 3, through ports a' and b' respectively in the sides of the shaft 3. The pipes 11a and 12b, mounted on the carrier, revolve with it.

At the other end of the shaft and surrounding it is a fixed or stationary head 16 having screw-threaded openings or ports A' and B' to receive the ends of the main pipes 11A and 11B respectively. These openings communicate with the passages A and B in the shaft 3, through ports a and b, in the sides of the latter, at the adjacent end of same.

In operation, therefor, the cooling water enters by way of the supply pipe 11A passes through the opening A' in the head 16 and port a of the shaft into the passage A, and upon reaching the other end of the shaft, it flows through the ports a', openings 11' (see Figure 6 showing the parts as seen from the right of Figure 1), and pipes 11a to the inlet openings 11 of the prongs; passes to the opposite end thereof, and back through the inner tubes 9 to the outlets 12. At these points it goes by way of the pipes 12b to the exhaust ports 12' in the arms 4; ports b', the main passage B to the port b at the end of the shaft in the head 16 and thus through the port B' to the exhaust pipe 12B.

The arms are thus kept cool but the flow of the water is not continuous. While the main passages A and B are always in communication with the pipes 11a and 12b, these passages are not connected to the main pipes 11A and 12B except when the shaft with its ports a and b is in the position shown on Figure 7. Both of these main pipes are then in communication with the passages A and B, in the shaft 3 and water can then enter and leave the apparatus. Before the shaft in its rotation reaches the position shown in Figure 7, both the passages A and B will be disconnected from the main supply and exhaust pipes, or only one of them will be so connected. If the rotation is counter-clockwise in Figure 7, the port b might come into registry first with the supply pipe 11A, for example, but no water could then pass into the machine because there is yet no communication with the outlet pipe 12B. Further revolution of the shaft brings port a opposite the opening A', and port b opposite opening B'. Both passages in the shaft are now connected to the main supply and exhaust pipes 11A and 12A, and for a short interval some water is forced in and some forced out. Further rotation will then carry the port b out of communication with the pipe 12B, and bring the other port a into communication with this pipe, but now, there is no flow, because the supply pipe 11A is cut off from the passage A. The next feeding of the cooling agent does not take place until a full revolution of the puller has been completed.

The head 16 has projections 17, which enable it to be fastened and held in fixed position against the hood or casing 18, which covers or guards the sprocket 7. These projections 17 have holes 19 for bolts 20, which engage the chain guard 18, but are surrounded by spacing sleeves 21, to hold the head a fixed distance from it. The shaft 3, of course, rotates in this head, and packing is put in both ends of the head to prevent leakage. In the middle the head fits the shaft snugly but at the two ends the head is bored larger as shown at 22 to provide seats 23. Against these seats are placed circular packing rings or gaskets 24. Around the shaft, at one end of the head, is a gland 25, which presses in against the packing, and has outside perforated lugs 26 for bolts 27 in openings through the wings or lugs 17, to hold this gland in place on the head 16. This gland lies between the chain guard 17 and the gear 7. At its other end, the head 16 receives similar packing rings, and has a gland 28 with apertured projections 29 for bolts 30, to secure this gland to similar projections 31 on the head 16. The head 16 is thus packed at both ends against leakage, and water flowing through the pipes 11A and 12B can only pass by way of the passages A and B in the shaft 3. The passages A and B are bored entirely through the shaft 3, but at both ends they can be closed by plugs 32. The flow of the cooling agent through the main supply and exhaust pipes is controlled by hand valves 33.

With this machine the mode of operation is so controlled that the work can proceed rapidly and each batch of candy can be taken off without sticking to the prongs 5 and 6. The efficiency, capacity, and rate of production of the machine are greatly increased, but no great cost is added to the expense of building the machine, because the various passages and ports can be easily formed, and the only new parts that are required are the head 16, the bolts for mounting it on the chain guard 18, and the piping. The cost of operation is practically no greater, because very little expense is entailed for the water or other cooling medium, which may be forced through the machine either by the existing pressure in the water pipes or by a small pump.

While I have described but one half of the machine, according to this invention it will be understood that the other half, comprising a post, shaft, carrier member, and prongs of the type set forth, will be supplied with a cooling medium in the same way.

The casing or chain guard 18 is not shown, but is indicated only by the dot-and-dash line in Figure 1 adjacent the head or element 16. Since this chain guard is not a part of the invention, more complete illustration is unnecessary; and, of course, any other suitable support may be used for mounting the head 16 in position on the shaft 3.

In practice the cooling medium, which is conducted into and out of the machine, prevents adhesion of the candy to the prongs and affords uniform pulling and aeration throughout each mass that is worked. Also, the hard spots that appear in candy treated by machines of uncooled construction are eliminated; and the flavor, which is supplied to the candy while it is pulled and stretched by the prongs, is distributed evenly through the batch; and the right consistency and color of the candy are realized.

While I have described the invention in connection with a machine having revolving prongs, I may also practice it in connection with machines having prongs adapted to move in a different manner, as will be understood.

Having described my invention, what I believe to be new and desire to secure and protect by Letters Patent of the United States is:

1. A candy-making machine comprising a hollow prong, means for revolving said prong and means comprising rotatable pipes for carrying a cooling agent to said prong.

2. A candy-making machine comprising a movable carrier member, a prong affixed thereto, said prong being hollow and having an inlet adjacent said member, a tube affixed at one end within said prong, the latter having an opening adjacent the fixed end of said tube, communicating with said tube, and pipes fixed on the carrier and connected to said inlet and said opening.

3. A candy-making machine comprising a bearing, a shaft in the bearing, a rotatable carrier affixed to the shaft, prongs on said carrier, the shaft having supply and exhaust passages for a cooling medium and pipes affixed to said carrier and said prongs to connect the passages in the shaft to the inside of said prongs.

4. A candy-making machine comprising a bearing having a shaft therein, prongs revolved by said shaft, the interior of the prongs being hollow, the shaft having passages connected to the interior of said prongs, a fixed head enveloping one end of the shaft, said head and said shaft having ports which come into registry as the shaft revolves and supply and exhaust pipes for a cooling medium connected to said ports in said head.

5. A candy-making machine comprising a rotatable prong, a shaft for revolving said prong, said prong being hollow, the shaft having passages for a cooling agent connected to the interior of said prong, a fixed head receiving one end of the shaft, said head and said shaft having ports to register as the shaft turns, pipes for the cooling agent connected to the head, the latter having a flange at one end and being enlarged at both ends to provide seats, packings on said seats around the shaft, and glands in the head to compress said packings.

6. A candy-making machine comprising a rotatable shaft, a carrier arm to be revolved thereby, the shaft having passages therein, hollow prongs on said arm connected to said passages, a head enveloping the shaft and having ports therein, said passages having ports to register with the ports in the head as the shaft rotates, and pipes for a cooling agent connected to the ports in the head.

7. A candy-making machine comprising a rotatable shaft, a carrier member thereon, hollow prongs affixed to the carrier member, the hub of said member having ports, inlet and outlet pipes on said member connecting said ports to the prongs, the shaft having passages connected to said ports at one end, and a fixed head on the opposite end of the shaft containing packings at both ends to engage the shaft, supply and exhaust pipes connected to the head between the packings, the head having inside ports for the last-named pipes, and said shaft having ports for registering with the ports in the head to connect said passages to the supply and exhaust pipes.

8. A candy-making machine comprising a hollow prong with an open-ended tube therein, said prong having apertures leading to the interior of the prong and the inside of the tube, a carrier for the prong and a shaft to actuate the carrier and prong, the shaft having passages and the carrier having means to connect said passages to said prongs.

9. A candy-making machine comprising a movable carrier, hollow prongs thereon, and means including pipes rigid with the carrier to conduct a cooling medium to the prongs.

10. A candy-making machine comprising a rotatable shaft, a carrier-member thereon, hollow prongs attached to the carrier-member, tubes having open ends mounted in said prongs, the latter having openings leading to the inside thereof and the inside of said tubes, the carrier-member having ports, pipes on the carrier-member connecting the ports therein to the openings in the prongs, the shaft having passages therein communicating with the ports in the carrier, a head on the shaft and containing packings at both ends to engage the shaft, main supply and exhaust pipes connected to the head between the packings, the head having ports therein for the last-named pipes, and the shaft having ports to communicate with the ports in the head to put the passages in communication with the main supply and exhaust pipes as the shaft rotates.

11. A candy-making machine comprising a bearing having a shaft therein, prongs revolved by said shaft, the interior of the prongs being hollow, the shaft having means forming passages connected to the interior of said prongs, a head for the shaft, said head and said shaft having ports which register and supply and exhaust pipes for a cooling medium connected to said ports in said head.

12. A candy-making machine comprising a rotatable prong, a shaft for revolving said prong, said prong being hollow, the shaft having means forming passages for a cooling agent connected to the interior of said prong, a head for the shaft, said head and said shaft having ports to register as the shaft turns, pipes for the cooling agent connected to the head, the latter having a flange at one end and being shaped inside at both ends to provide seats, packings on said seats around the shaft, and glands in the head to compress said packings.

13. A candy-making machine comprising a rotatable shaft, a carrier member thereon, hollow prongs affixed to the carrier member, the hub of said member having ports, inlet and outlet pipes on said member connecting said ports to the prongs, the shaft having passages connected to said ports, and a fixed head on the shaft containing packings at both ends to engage the shaft, supply and exhaust pipes connected to the head between the packings, the head having inside ports for the last-named pipes, and said shaft having ports for registering with the ports in the head to connect said passages to the supply and exhaust pipes.

14. A candy-making machine comprising a rotatable shaft, a carrier-member thereon, hollow prongs attached to the carrier-member, tubes having open ends mounted in said prongs, the latter having openings leading to the inside thereof and the inside of said tubes, the carrier-member having ports, pipes on the carrier-member connecting the ports therein to the openings in the prongs, the shaft having passages therein communicating with the ports in the carrier, a head on the shaft, main supply and exhaust pipes connected to the head, the latter having ports therein for the last-named pipes, and the shaft having ports to communicate with the ports in the head to put the passages in communication with the main supply and exhaust pipes as the shaft rotates.

15. A candy-making machine having hollow prongs with inlets and outlets, means comprising a shaft to actuate the prongs, the shaft having means forming passages for a cooling agent, and means for connecting the passages to the inlets and outlets of said prongs.

16. A candy-making machine having hollow movable prongs, a carrier therefor, a shaft for said carrier and prongs and means associated with said shaft having ports for a cooling agent, said shaft having means forming passages to be connected to said ports, and means associated with said carrier and connected to said passages for transmitting said agent to the prongs.

17. A candy-making machine comprising a movable shaft, hollow prongs actuated by said shaft, and means associated with said shaft having ports for a cooling agent, the shaft having means forming passages to transmit the cooling agent to said prongs.

18. A candy-making machine comprising a movable shaft, a carrier thereon, prongs supported by said carrier, said shaft having means forming passages, and means associated with the carrier to transmit a cooling agent to said prongs through said passages.

19. A candy-making machine comprising a bearing, a shaft in the bearing, a rotatable carrier affixed to the shaft, prongs on said carrier, the shaft having means forming supply and exhaust passages for a cooling medium and means associated with said carrier and said prongs to connect the passages of the shaft to the inside of said prongs.

20. A candy-making machine comprising a rotatable shaft, a carrier-member thereon, hollow prongs attached to the carrier-member, the prongs having openings leading to the inside thereof, the carrier-member having ports and means connecting the ports therein to the openings in the prongs, the shaft having passages therein communicating with the ports in the carrier, a head on the shaft, main supply and exhaust pipes connected to the head, the latter having ports therein for the last-named pipes, and the shaft having ports to communicate with the ports in the head to put the passages in communication with the main supply and exhaust pipes.

RAY W. KROUT.